April 23, 1929.  H. A. DROLETTE ET AL  1,710,452
GEAR SHIFT LEVER KNOB
Filed July 21, 1927
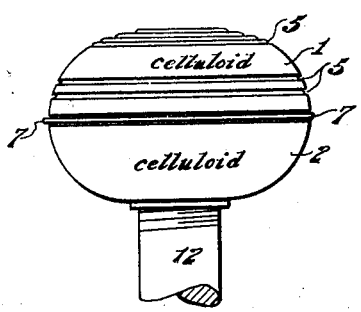
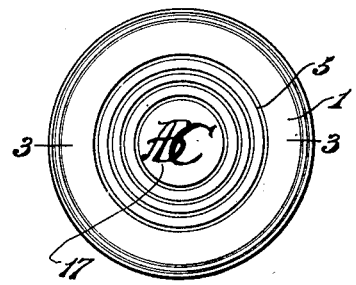
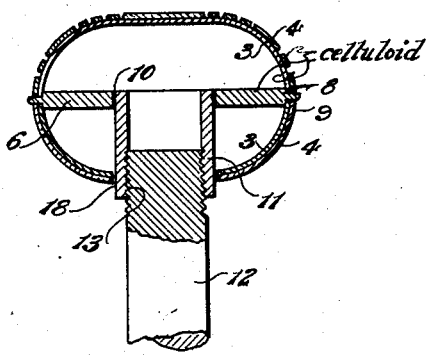
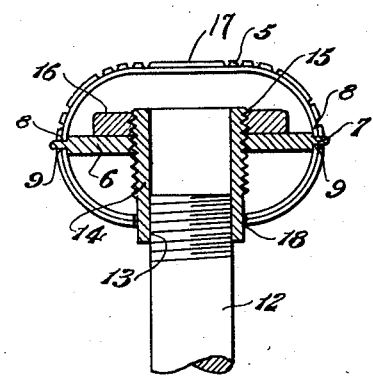
INVENTORS,
Henry A. Drolette,
Signor Herne,
William J. Harrington,
BY
Harry W. Bowen
ATTORNEY.

Patented Apr. 23, 1929.

1,710,452

UNITED STATES PATENT OFFICE.

HENRY A. DROLETTE, SIGNOR HERNE, AND WILLIAM J. HARRINGTON, OF SPRINGFIELD, MASSACHUSETTS.

GEAR-SHIFT-LEVER KNOB.

Application filed July 21, 1927. Serial No. 207,394.

This invention relates to improvements in gear shift lever knobs which are attached to the upper end of the gear shift lever of a motor vehicle. It comprises two hollow shell members which are semispherical in shape, and between the opposed or meeting edges of which is inserted a piece which is disk shape. These members are permanently secured together and to the disk by means of a soluble celluloid cement. The disk member is formed with a centrally located opening for receiving an internally threaded member that is designed for attaching the knob to the upper end of the shift lever. The shell members are preferably formed of thin layers of celluloid having different colors. The outer layer having grooves that are cut deep enough to expose the inner layer of different colored celluloid for the purpose of presenting an attractive appearance.

The invention comprises two forms for attaching the internally threaded tubular members to the internally located disk. The invention is designed to take the place of the usual metal knob on the upper end of the gear shift lever. The purpose of the internally located disk member is for preventing the shell from being crushed and for providing means for attaching the threaded tubular member, which member extends through an opening in the lower one of the shells.

Referring to the drawings:

Fig. 1 is an elevational view showing the knob attached to the shift lever.

Fig. 2 is a top plan view.

Fig. 3 is a sectional view on the line 3—3 of Fig. 2.

Fig. 4 is a sectional view on the same line as Fig. 3, showing a modification for securing the tubular member, and Fig. 5 is a detailed sectional view of the two shells.

Referring to the drawings in detail:

1 designates the upper semispherical shell member, and 2 the lower semispherical shell member. Each of these members is composed of inner and outer layers 3 and 4 of celluloid which are cemented together as shown in Figs. 3, 4 and 5. These members are preferably of different colors, as the inner layer may be of a yellowish or other suitable color, and the upper one of a white or pearl color. The outer shell 4 is formed with grooves 5 which exposes the inner colored layer. 6 is a disk of celluloid which is formed with a rib 7 that provides a bearing for the oppositely located edges 8 and 9 of the two shell members to rest thereon when the parts are assembled. The shells are permanently secured to the rib 7 of the disk by means of celluloid cement. It will be noticed that the rib 7 projects beyond the outer surface of the two shells for forming an attractive appearance, as shown in Fig. 1. This centrally located disk 6 is formed with an opening 10 for receiving the internally threaded tubular member 11, which member is secured to the disk 6 (see Fig. 3) by means of celluloid cement. This disk is located in a plane passing through the horizontal diameter of the knob. The shift lever of the motor vehicle, indicated at 12, is threaded at its upper end to receive the threads 13 of the tubular member 11. The tubular member being preferably composed of the same material.

Fig. 4 illustrates a modification in which the tubular member 14 is formed with threads 15 at its inner end, which threads are located in the central opening of the disk 6 and is locked in place by means of the nut 16. The member 2 is formed with an opening 18 through which the tubular members 11 and 14 project, as shown. The upper slightly flattened surface 17 may be used to engrave the monogram of the owner of the car, as indicated in Fig. 2.

From this description it will be seen that we have provided a detachable knob for gear shift levers that is not only attractive but one that may be manufactured with small expense.

What we claim is:

1. As an article of manufacture a gear shift lever knob comprising two semispherical shell members, a disk member located between the edges of the shell members, the disk member having a rib portion for permanently securing the opposed edges of the shell members together, the disk having an opening for attaching a tubular member thereto and one of the shell members having an opening through which the tubular member projects.

2. As an article of manufacture, a hollow knob device formed from a plurality of layers of celluloid substantially semispherical in cross section, an externally threaded tubular member, a centrally located disk member having an opening to receive the externally threaded tubular member in the opening, a nut for locking the tubular member to the disk member, the shell members being permanently attached to the centrally located disk member.

3. As an article of manufacture two semispherical shell members each being of moldable material, a disk having a rib portion for receiving the opposite edges of the shell members, the disk having an opening, an externally threaded tubular member secured in the opening of the disk and projecting through an opening in one of the said shell members to permit attaching the article to a gear shift lever.

4. A knob device comprising semispherical shell members of pliable material, a disk having a projecting peripheral rib to receive the opposite edges of the shell members to which they are permanently secured, the disk having a centrally located threaded opening and one of the shell members having an opening, an externally threaded tubular member located in the threaded opening of the disk, a nut for securing the tubular member to the disk and projecting through the opening in the said shell member, the tubular member being internally threaded for attaching the knob to a gear shift lever.

5. As an article of manufacture, two semispherical shell members, each being of pliable material, as celluloid, a disk, having an opening, which is located between the meeting edges of the shell members, an externally threaded tubular member located in the opening of the disk for attaching the article to a gear shift lever, the upper outer surface of the upper shell member having a flat surface for inscribing a monogram, or the like, thereon.

6. As an article of manufacture, two semispherical shell members, each being formed of pliable material, as celluloid, a disk having an opening which is located between the meeting edges of the shell members, an externally threaded tubular member located in the opening of the disk for attaching the article to a gear shift lever, the upper outer surface of the upper shell member having a plurality of concentric rings or grooves formed therein and a flat surface within the uppermost ring for inscribing a monogram, or the like thereon.

HENRY A. DROLETTE.
SIGNOR HERNE.
WILLIAM J. HARRINGTON.